(No Model.)
O. ZWIETUSCH.
FILTERING MATERIAL.
No. 398,110. Patented Feb. 19, 1889.
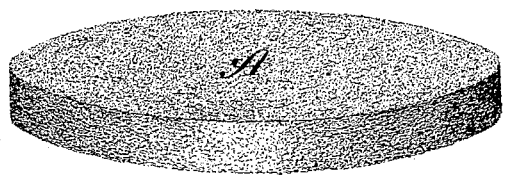
Witnesses:
Inventor:
Otto Zwietusch,
By Dyrenforth & Dyrenforth,
Att'ys

UNITED STATES PATENT OFFICE.

OTTO ZWIETUSCH, OF MILWAUKEE, WISCONSIN.

FILTERING MATERIAL.

SPECIFICATION forming part of Letters Patent No. 398,110, dated February 19, 1889.

Application filed July 16, 1888. Serial No. 280,085. (No specimens.)

*To all whom it may concern:*

Be it known that I, OTTO ZWIETUSCH, a citizen of the United States, residing at Milwaukee, in the county of Milwaukee and State of Wisconsin, have invented a new and useful Improvement in Filtering Material, of which the following is a specification.

My invention relates to a filtering material for use in filters for general purposes, but particularly for the filtration of beer; and my object is to produce an article of filtering material so prepared as to be easy of transportation, always ready for use, and not liable to spoil with keeping, and at the same time to have it divided into portions of definitely-measured quantity.

To prepare the article, I take wood fiber ground in a wet state direct from the mill, or in a dry state in a form resembling blotting-paper or pasteboard, and prepare and cleanse it by boiling with muriatic acid or caustic soda to get rid of all substances which may prove destructive to or have an injurious effect upon beer. After it has been well cleansed and prepared I put it into a press in separate and equally-measured quantities, and by expressing the free water cause each separate portion to form a block of such shape as may be desired, after which I dry it by means of heat or simple exposure to the atmosphere. By pressing the material into blocks of definite quantity properly regulated I am able to cause each block to constitute the requisite quantity for one filtering-layer or an aliquot part thereof. It will thus be seen that the element of thickness is an important one in connection with my invention.

The drawing represents in perspective a block of my filtering material in one of the most convenient forms into which it can be compressed—namely, in the form of a disk, A, an inch, or thereabout, in thickness and of such diameter as to constitute the proper quantity.

For use the block of pressed and dried filtering material is made into a pulp with water and put into the filter. Heretofore such filtering material has been prepared with salicylic acid and alcohol with a view to preserving it; but in this case it is necessary to keep the material in a moist state, and it easily becomes spoiled by age or on account of evaporation of the alcohol. The moist condition, moreover, greatly increases the weight and causes considerable trouble and expense in the matter of transportation. Besides this, the fact that the degree of moisture is not uniform, but varies materially at different times and under different conditions, renders it very difficult to judge with any degree of accuracy as to the quantities to be used for the filtering-layers.

On the other hand, by forming my article as above described and preserving it in a dry state it remains in good condition for any length of time, besides being of light weight in transportation and always yielding a certain and distinct quantity for use.

What I claim as new, and desire to secure by Letters Patent, is—

As a new article of manufacture for filtering purposes, a compressed block of comminuted and purified wood fiber, substantially as described.

OTTO ZWIETUSCH.

In presence of—
JOHN G. HIRSCH,
HENRY SCHINZ.